US012030476B2

(12) United States Patent
Rho et al.

(10) Patent No.: US 12,030,476 B2
(45) Date of Patent: Jul. 9, 2024

(54) SAFE DRIVING SUPPORT SYSTEM BASED ON MOBILE IOT AGENT AND METHOD FOR PROCESSING THEREOF

(71) Applicants: Jeju Special Self-Governing Province, Jeju-si (KR); SIGNTELECOM Co., Ltd., Seoul (KR); JINSYSTEM Co., Ltd., Jeju-si (KR)

(72) Inventors: Hee Sub Rho, Jeju-si (KR); Ki Hong Kim, Jeju-si (KR); Sung Kwuen Hong, Jeju-si (KR); Sang Il Im, Anyang-si (KR); Young Ki Park, Seoul (KR); Ja Duk Gu, Seoul (KR); Byung Seok Kim, Uijeongbu-si (KR); Kyung Jong Kim, Incheon (KR)

(73) Assignees: JEJU SPECIAL SELF-GOVERNING PROVINCE (KR); SIGNTELECOM CO., LTD. (KR); JINSYSTEM CO., LTD. (KR)

( * ) Notice: Subject to any disclaimer, the term of this patent is extended or adjusted under 35 U.S.C. 154(b) by 209 days.

(21) Appl. No.: 17/835,150

(22) Filed: Jun. 8, 2022

(65) Prior Publication Data

US 2022/0297644 A1    Sep. 22, 2022

Related U.S. Application Data

(63) Continuation of application No. PCT/KR2020/018185, filed on Dec. 11, 2020.

(30) Foreign Application Priority Data

Dec. 13, 2019  (KR) ........................ 10-2019-0166388

(51) Int. Cl.
*B60T 7/22*  (2006.01)
*B60Q 9/00*  (2006.01)
(Continued)

(52) U.S. Cl.
CPC ................ *B60T 7/22* (2013.01); *B60Q 9/008* (2013.01); *G08G 1/127* (2013.01); *G08G 1/166* (2013.01);
(Continued)

(58) Field of Classification Search
CPC ................ B60T 7/22; B60T 2201/022; B60T 2210/32; B60T 2210/36; B60T 2220/00;
(Continued)

(56) References Cited

U.S. PATENT DOCUMENTS

2017/0053461 A1* 2/2017 Pal ........................ G08G 1/012
2019/0083022 A1* 3/2019 Huang ................... A61B 5/024

* cited by examiner

*Primary Examiner* — Jacob M Amick
(74) *Attorney, Agent, or Firm* — Park & Associates IP Law Office (57) ABSTRACT

The present disclosure relates to a safe driving support system based on a mobile Internet of Things (IoT) agent, and a processing method thereof. The safe driving support system based on a mobile IoT agent may provide an accident response service for preventing a traffic accident in advance by obtaining GNSS-based position information of each of vehicles, collecting various information on a driver's status and a vehicle driving status of the vehicle that is being driven in real time to construct big data, and analyzing and repeatedly learning the collected information. According to the present disclosure, it is possible to provide the ground for providing various services capable of decreasing traffic accidents by obtaining driving information of a short cycle using a GNSS platform and analyzing the driving information to apply the driving information to traffic safety and accident prevention activities.

6 Claims, 4 Drawing Sheets

(51) Int. Cl.
*G06V 20/59* (2022.01)
*G08G 1/127* (2006.01)
*G08G 1/16* (2006.01)

(52) U.S. Cl.
CPC ..... *B60T 2201/022* (2013.01); *B60T 2210/32* (2013.01); *B60T 2210/36* (2013.01); *B60T 2220/00* (2013.01); *G06V 20/597* (2022.01)

(58) Field of Classification Search
CPC ........ B60Q 9/008; G08G 1/127; G08G 1/166; G06V 20/597
See application file for complete search history.

SAFE DRIVING SUPPORT SYSTEM BASED ON MOBILE IOT AGENT AND METHOD FOR PROCESSING THEREOF

REFERENCE TO RELATED APPLICATIONS

This is a continuation of International Patent Application PCT/KR2020/018185 filed on Dec. 11, 2020, which designates the United States and claims priority of Korean Patent Application No. 10-2019-0166388 filed on Dec. 13, 2019, the entire contents of which are incorporated herein by reference.

FIELD OF THE INVENTION

The present disclosure relates to a safe driving support system based on a mobile Internet of Things (IoT) agent, and more specifically, to a safe driving support system based on a mobile IoT agent that collects various information such as a driver's status and a vehicle driving status according to vehicle driving in real time or periodically based on sensors using a high-precision position-based platform, senses various driver's statuses such as a drowsy driving status and a driver's mental and physical status that occur during the vehicle driving by analyzing and learning the collected information, and providing an accident response service such as traffic accident prevention for responding to drowsy driving to a driver in advance by analyzing and learning the collected information, and a processing method thereof.

BACKGROUND OF THE INVENTION

Various types of traffic accidents such as vehicle-to-vehicle accidents and vehicle-to-person accidents have occurred during driving of vehicles such as cars, buses, and taxis. Recently, due to a rapid increase in the number of automobiles, the incidence of traffic accidents tends to rapidly increase. The traffic accidents cause serious social and economic damage. In particular, the incidence of traffic accidents due to drowsy driving is about 8 times higher than that of general traffic accidents, and in most situations, a driver is not aware of an accident at a point in time when the accident has occurred, and thus, an occurrence probability of a big accident becomes higher.

In general, when a traffic accident occurs, a report is received through an insurance company after the traffic accident, and a driver asks a police for help or accident information is received through the Road Traffic Authority or the like. Traffic accident information has been aggregated and published based on results of organizing the overall accident sequences, accident sizes, and the like, through such processes.

Accordingly, the National Police Agency, the Road Traffic Authority, and the like, have disclosed accident information to an Open Data Portal after aggregating accidents, have made policy decisions based on a risk index for each road or the like, or have improved roads and have shared information on accidents. However, currently, these have been based on reports received by the police and data organized after the accidents, and traffic accident information has been provided within the scope of information that provides post-processing results for the accidents.

Accordingly, there is a need for a response service capable of preventing a traffic accident by sensing a driver's status or a vehicle driving status in real time before the traffic accident occurs and notifying or warning the driver of the sensed status.

RELATED ART DOCUMENT

Patent Document

Korean Patent Laid-Open Publication No. 10-2018-0086976 (published on Aug. 1, 2018)
Korean Patent Laid-Open Publication No. 10-2015-0106986 (published on Sep. 23, 2015)
Korean Patent Laid-Open Publication No. 10-2019-0090742 (published on Aug. 2, 2019)
Korean Patent No. 10-1705888 (published on Feb. 13, 2017).

SUMMARY OF THE INVENTION

An object of the present disclosure is to provide a safe driving support system based on a mobile Internet of Things (IoT) agent for providing an accident response service capable of preventing a traffic accident by sensing and collecting various information on a driver's status and a vehicle driving status at the time of vehicle driving and analyzing and learning the various information, and a processing method thereof.

Another object of the present disclosure is to provide a safe driving support system based on a mobile Internet of Things (IoT) agent for preventing a traffic accident in advance by measuring and correcting high-precision position information according to vehicle driving in real time using a high-precision global navigation satellite system (GNSS) platform and informing a driver of an event occurring during the vehicle driving or raises an alarm or generating a warning against the event, and a processing method thereof.

Still another object of the present disclosure is to provide a safe driving support system based on a mobile Internet of Things (IoT) agent for sensing a driver's drowsy driving status and warning a driver of the driver's drowsy driving status, and a processing method thereof.

A safe driving support system based on a mobile IoT agent according to the present disclosure for accomplishing the above objects senses various information according to vehicle driving in real time based on sensors, collects the various information through an IoT agent, and analyzes the collected information to notify a driver of various events occurring during the vehicle driving or generate a warning against the various events. The safe driving support system based on a mobile IoT agent as described above may sense, for example, driver's drowsy driving, a sudden change of a driver's mental and physical status, speeding, a sudden start, a sudden stop, a sudden lane change, a road risk situation, and the like, and notify the driver of the sensed driver's drowsy driving, sudden change of the driver's mental and physical status, speeding, sudden start, sudden stop, sudden lane change, road risk situation, and the like, in real time to prevent a traffic accident.

A safe driving support system based on a mobile IoT agent according to the present disclosure includes: a smart band worn by a driver of a vehicle that is being driven and sensing heart rate information of the driver and acceleration information according to driver's movement; a driver status monitoring (DSM) device installed inside the vehicle, including a first camera module, and obtaining an image including a driver's iris and face to sense driver status information; an advanced driver assistance system (ADAS) device installed in the vehicle, including a second camera module and a radar module to obtain an image around the vehicle during vehicle driving, receiving vehicle driving information according to the vehicle driving from an onboard diagnostics-II (OBD2) device of the vehicle in real time to generate driver assistance information, and transmitting a notification command to the OBD2 device when an event occurs in the driver assistance information; an advanced emergency braking system (AEBS) device generating emergency braking information and transmitting the emergency braking information to the ADAS device when the OBD2 device receives the notification command from the ADAS device and operates a brake actuator; a global navigation satellite system (GNSS) terminal installed in the vehicle, connected to a plurality of base stations through an artificial satellite to obtain position information of the vehicle in real time, receiving the heart rate information and the acceleration information from the smart band and the DSM device, receiving the vehicle driving information and the emergency braking information from the ADAS device, and transmitting the driver status information of the vehicle and the vehicle driving information; and an accident response service server providing an accident response service so as to prevent a traffic accident by collecting the position information of the vehicle, the driver status information, and the vehicle driving information transmitted from the GNSS terminal included in each of a plurality of vehicles and analyzing and learning the collected information to detect driver's drowsy driving or notify or warn the driver of an event occurrence situation by transmitting notification information to a driver terminal when the event occurs during the vehicle driving.

The GNSS terminal may automatically switch channel connections with adjacent base stations during the vehicle driving to correct the obtained position information in real time.

The accident response service server may statistically analyze the collected information to determine whether or not the event has occurred according to a driver's status and a vehicle driving status, analyze images obtained from the first camera module to determine a driver's drowsy driving status, or analyze a pattern of the driver status information and the vehicle driving information to predict whether or not an accident is to occur.

The accident response service server may repeatedly learn the collected information and an analysis result so as to determine at least a driver's status, a vehicle driving status, an accident type prediction, and a road risk to construct big data for providing the accident response service.

The accident response service server may calculate a risk index of a road on which the vehicle is being driven through the position information of the vehicle and the vehicle driving information, and provide the calculated road risk index to the driver of the vehicle that is being driven in real time.

The accident response service server may determine whether or not the driver is in a drowsy driving status through pattern learning of the driver status information, and provide information indicating that the driver is in the drowsy driving status to the driver of the vehicle that is being driven in real time when the driver is in the drowsy driving status.

As described above, the safe driving support system based on a mobile IoT agent according to the present disclosure described above may provide the accident response service for preventing a traffic accident in advance by obtaining GNSS-based position information of each of the vehicles, collecting various information on the driver's status and the vehicle driving status of the vehicle that is being driven in real time to construct big data, and analyzing and repeatedly learning the collected information.

In addition, the safe driving support system based on a mobile IoT agent according to the present disclosure may prepare the ground for providing various services capable of decreasing a traffic accident by obtaining driving information of a short cycle using a GNSS platform and analyzing the driving information to apply the driving information to traffic safety and accident prevention activities or building a data operation platform that may provide related information so as to be applied to various fields such as a map guidance service and providing the data operation platform not only to related organizations such as the National Police Agency and the Road Traffic Authority, but also to private companies such as navigation companies and public data portals.

Further, the safe driving support system based on a mobile IoT agent according to the present disclosure may open data as public data so as to be applied to various applications to secure a quality and a standard of the data, support various data amounts and formats, provide the data in various forms and for various purposes, and continuously manage the data.

Further, in a case where the safe driving support system based on a mobile IoT agent according to the present disclosure provides information related to an accident response service to an accident support system such as the Road Traffic Authority, such information is compositely analyzed together with fatal traffic accident information received by the police, information on accident black spots for a traffic weak person and each accident characteristic, and data on traffic accidents that have occurred in the past and accidents caused by weather and a sudden situation, and the National Police Agency, the Road Traffic Authority, and the like, open fatal traffic accident position information, traffic accident information, accident black spot information, and a road risk index in real time through a traffic accident analysis system, a public data portal, or the like, such that various services capable of decreasing traffic accidents in various fields may be provided.

In addition, private companies such as navigation companies may improve accuracy of accident guidance and increase diversity of guidance contents by providing a differentiated road risk index according to a road type and a driver vehicle type through a more three-dimensional map guidance service. For example, the private companies notify a driver that a specific zone is a high-risk zone where fatal accidents are concentrated between 00:00 and 00:00 when a vehicle passes through the specific zone at a specific time or provide an automatic notification service to the driver when the vehicle passes through a zone in which fatal accidents have frequently occurred, such that a preemptive accident decrease effect may be expected.

In addition, insurance companies may increase satisfaction of policyholders through various special contracts and premium option products utilizing the opened data.

In addition, research institutes are expected to be able to secure diversity of research by utilizing traffic accident information in existing provided traffic flow information at the time of conducting research for traffic safety and be able to improve accuracy of accident analysis and statistical data.

Furthermore, local governments may apply such information to activation of public services such as road structure reorganization and signal system improvement in zones where traffic accidents frequently occur, and are expected to reduce social cost due to a decrease in a rate of traffic accidents and improve stability and convenience of the people through a job creation increase effect due to the development of a data industry by utilizing the position information of fatal traffic accidents.

DETAILED DESCRIPTION OF THE INVENTION

Embodiments of the present disclosure may be modified into several forms, and it is not to be interpreted that the scope of the present disclosure is limited to embodiments described below. Embodiments are provided in order to more completely describe the present disclosure to those skilled in the art. Accordingly, shapes and the like of components in the drawings have been exaggerated in order to emphasize a clearer description.

Hereinafter, an embodiment of the present disclosure will be described in detail with reference to the accompanying FIGS. 1 to 4.

Figure 1:
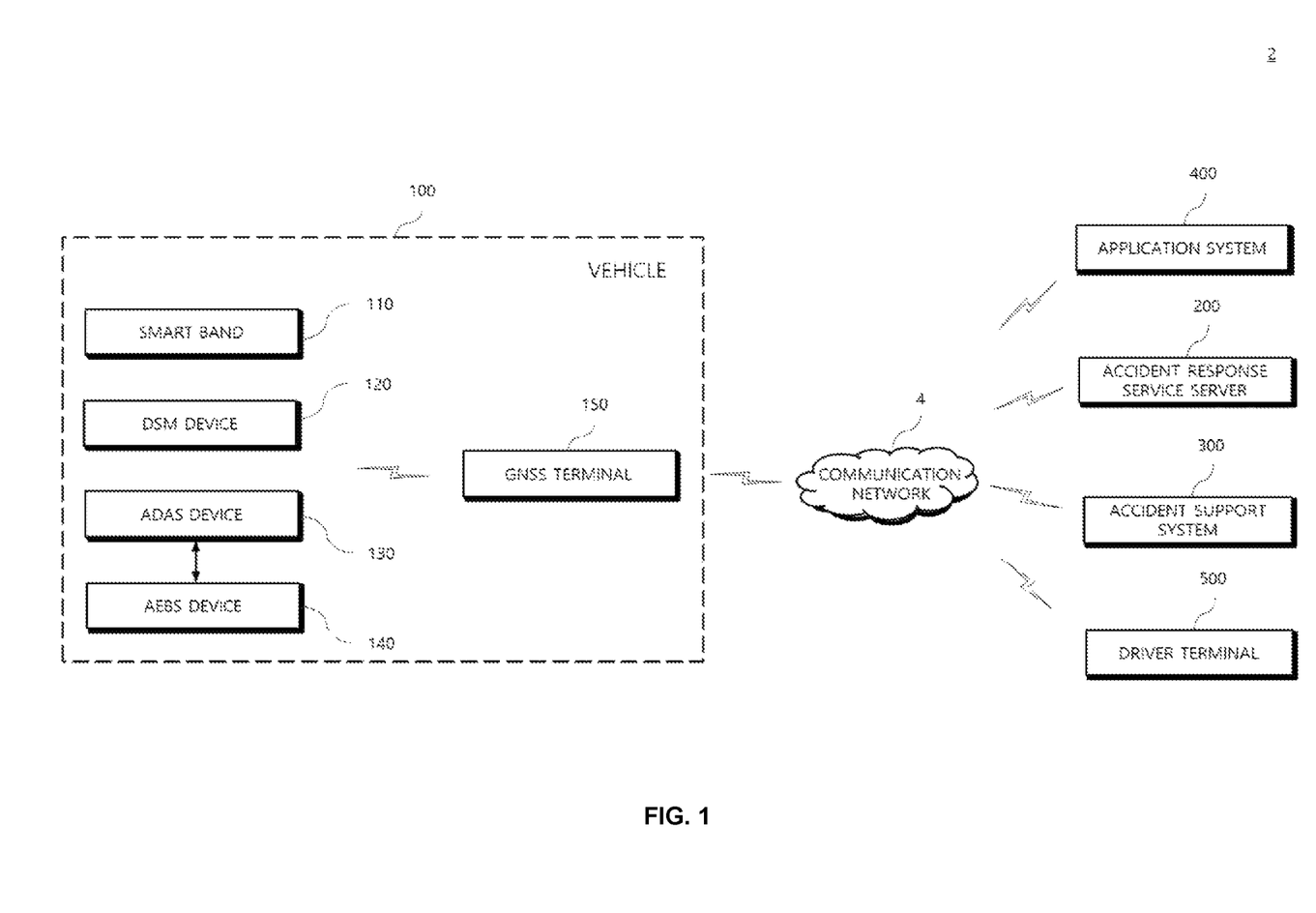
FIG. 1 is a block diagram illustrating a network configuration of a safe driving support system based on a mobile Internet of Things (IoT) agent according to the present disclosure.
Figure 2:
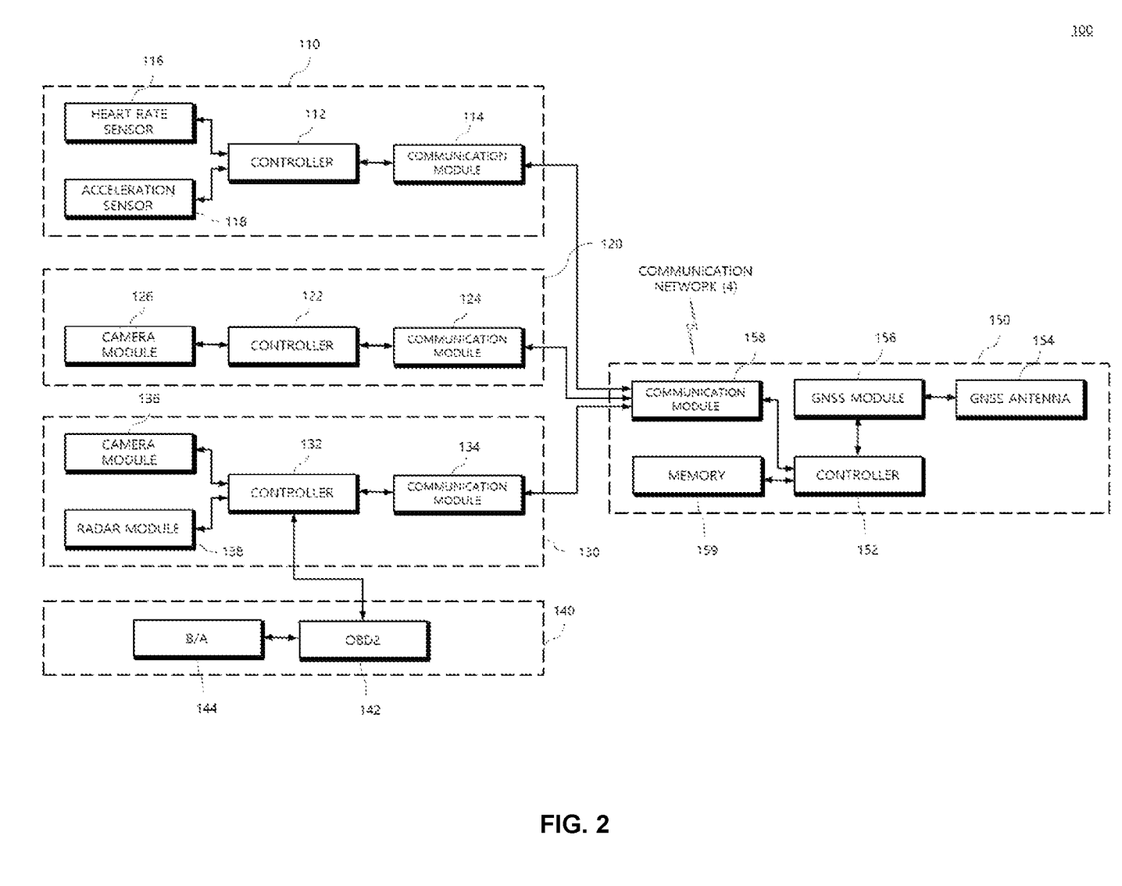
FIG. 2 is a block diagram illustrating configurations of a vehicle and a global navigation satellite system (GNSS) terminal illustrated in FIG. 1.
Figure 3:
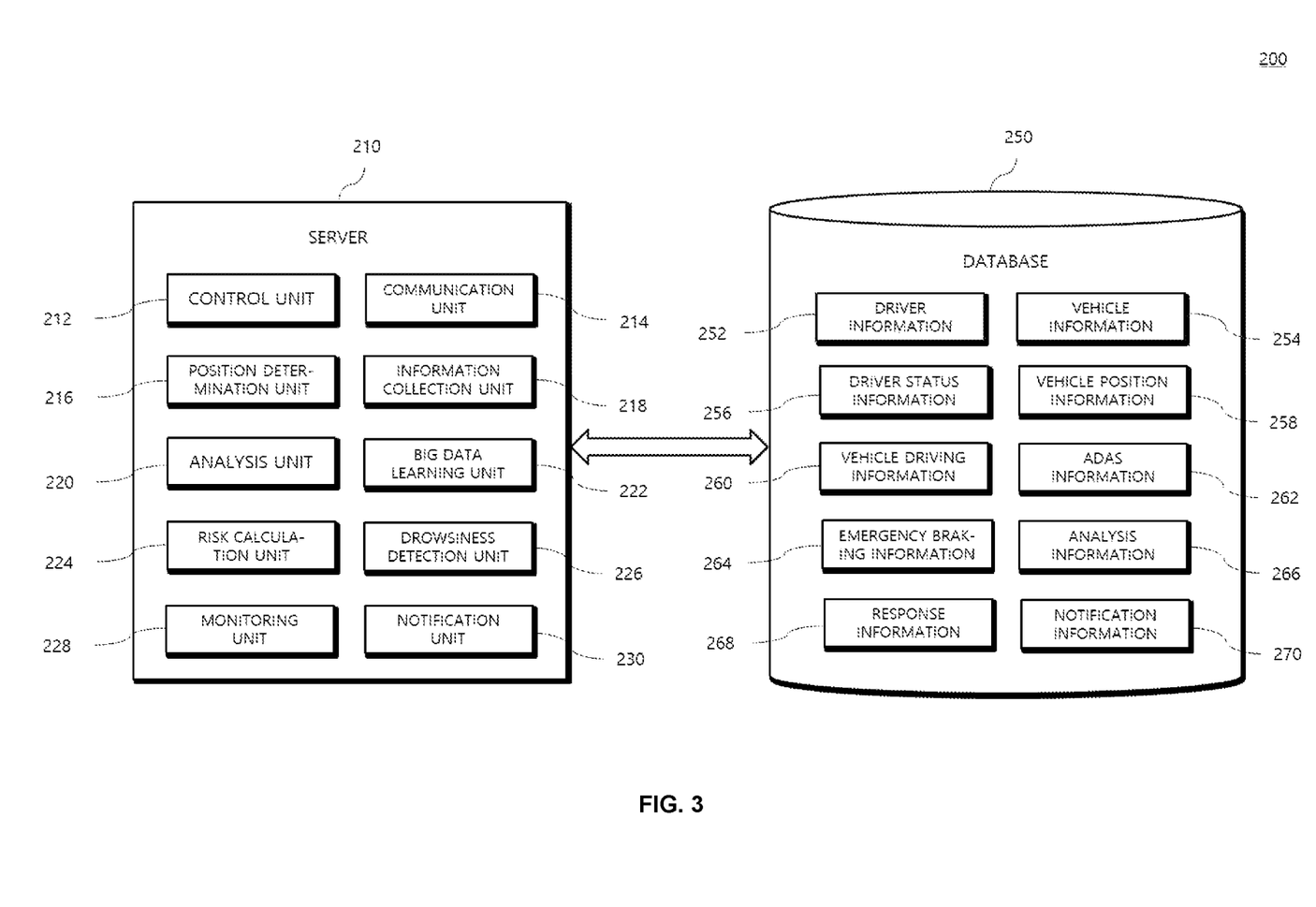
FIG. 3 is a block diagram illustrating a configuration of an incident response service server illustrated in FIG. 1.

FIG. 1 is a block diagram illustrating a network configuration of a safe driving support system based on a mobile Internet of Things (IoT) agent according to the present disclosure, FIG. 2 is a block diagram illustrating configurations of a vehicle and a global navigation satellite system (GNSS) terminal illustrated in FIG. 1, and FIG. 3 is a block diagram illustrating a configuration of an incident response service server illustrated in FIG. 1.

Referring to FIG. 1, a safe driving support system 2 based on a mobile IoT agent according to the present disclosure senses various information according to vehicle driving in real time based on sensors to collect the various information through an IoT agent, senses various events such as driver's drowsy driving, a sudden change of a driver's mental and physical status, speeding, a sudden start, a sudden stop, a sudden lane change, and a road risk situation that occur during the vehicle driving by analyzing the collected information, and informs a driver of the sensed event or generates a warning against the sensed event to prevent a traffic accident.

Such a safe driving support system 2 based on a mobile IoT agent according to the present disclosure may prepare the ground for providing various services capable of decreasing a traffic accident by obtaining driving information of a short cycle using a GNSS platform and analyzing the driving information to apply the driving information to traffic safety and accident prevention activities or building a data operation platform that may provide related information so as to be applied to various fields such as a map guidance service and providing the data operation platform not only to related organizations such as the National Police Agency and the Road Traffic Authority, but also to private companies such as navigation companies and public data portals.

To this end, the safe driving support system 2 based on a mobile IoT agent according to the present disclosure includes a communication network 4, a smart band 110 worn by the driver, a driver status monitoring (DSM) device 120, an advanced driver assistance system (ADAS) device 130, an advanced emergency braking system (AEBS) device 140, a GNSS terminal 150 that are installed in a vehicle 100, and an accident response service server 200. In addition, the safe driving support system 2 based on a mobile IoT agent according to the present disclosure may include an accident support system 300, an application system 400, and a driver terminal 500.

Specifically, the communication network 4 includes, for example, a wireless communication network such as Wireless Fidelity (WiFi) and Bluetooth, a mobile communication network such as long term evolution (LTE) and 5G, a dedicated communication network, and the like, and may be provided as a single communication network of each of these communication networks or a complex communication network of these communication networks. The communication network 4 is connected so that data communication is performed between the GNSS terminal 150 of the vehicle and the accident response service server 200. In addition, the communication network 4 may be connected so that data communication is performed between each of the accident support system 300, the application system 400, and the driver terminal 500, and the accident response service server 200.

The vehicle 100 includes a plurality of sensors, a camera, and a radar in order to sense a driver's status and a vehicle driving status during vehicle driving based on sensors. In the present embodiment, the vehicle 100 includes the smart band 110 and the DSM device 120 sensing the driver's status, and the ADAS device 130 and the AEBS device 140 sensing the vehicle driving status. In addition, the vehicle 100 includes a GNSS terminal 150 for tracking a position of the vehicle in real time and performing data communication with the accident response service server 200.

The smart band 110 is a wearable device worn by the driver, and senses heart rate information of the driver and acceleration information according to driver's movement. The smart band 110 transmits the sensed heart rate information and acceleration information to the GNSS terminal 150. To this end, the smart band 110 includes a heart rate sensor 116, an acceleration sensor 118, a communication module 114, and a controller 112, as illustrated in FIG. 2.

The heart rate sensor 116 senses, for example, a driver's heart rate in real time or periodically (in units of seconds and minutes) in order to determine a driver's mental and physical status, and transfers the heart rate information to the controller 112. The acceleration sensor 118 measures acceleration information according to the driver's movement in order to determine driver's drowsy driving, and transfers the acceleration information to the controller 112. The communication module 114 transmits the heart rate information and the acceleration information to the GNSS terminal 150 through, for example, a wireless communication network such as WiFi or Bluetooth or a mobile communication network such as LTE or 5G. In addition, the controller 112 controls the heart rate sensor 116, the acceleration sensor 118, and the communication module 114 so as to process functions of the smart band 110.

The driver status monitoring (DSM) device 120 is installed inside the vehicle 100, senses driver status information and transfers the sensed driver status information to the GNSS terminal 150. As illustrated in FIG. 2, the DSM device 120 according to the present embodiment includes a camera module 126, a communication module 124, and a controller 122.

The camera module 126 obtains an image including a driver's iris and face, recognizes the driver's iris and face, and transfers the recognized information to the controller 122. The communication module 124 transfers the driver status information to the GNSS terminal 150 through, for example, a wired interface such as a universal serial bus (USB) port or a serial port. In addition, the controller 122 controls the camera module 126 and the communication module 124 so as to process functions of the DSM device 120.

The DSM device 120 not only performs iris and face recognition using the camera module 126, but also includes various sensors sensing driver's biometric and health statuses, for example, an electrocardiogram sensor, a pulse wave sensor, an electroencephalogram sensor, and the like, disposed in a vehicle seat, a steering wheel, a seat belt, a gear transmission, and the like, may sense biometric information such as driver's electrocardiogram, pulse wave, and electroencephalogram through the electrocardiogram sensor, the pulse wave sensor, the electroencephalogram sensor, and the like, to monitor a driver's health status, mental and physical status, and the like, and determine whether or not an event such as a driver's drowsy driving status, fatigue status, attentiveness decrease status, or the like, has occurred. Accordingly, the safe driving support system 2 based on a mobile IoT agent according to the present disclosure senses the driver status information so as to determine the driver's drowsy driving status, mental and physical status, and the like, through the smart band 110 and the DSM device 120.

The advanced driver assistance system (ADAS) device 130 is connected to an on-board diagnostics-II (OBD2) device 142 of the vehicle 100 through controller area network (CAN) communication, an OBD2 port, or the like, receives various vehicle driving information according to vehicle driving from the OBD2 device 142 in real time, and generates ADAS information. The ADAS device 130 transmits the generated ADAS information to the GNSS terminal 150. Here, the vehicle driving information includes, for example, various information related to vehicle driving, such as vehicle information, a vehicle speed, a revolution per minute (RPM), an accelerator operation status, whether or not a brake operates, and a digital driving record, and the ADAS information includes information determined through the vehicle driving information, for example, information according to lane recognition, front vehicle recognition, pedestrian recognition, front object detection, distance measurement, and the like. The ADAS device 130 according to the present embodiment includes a camera module 136, a radar module 138, a communication module 134, and a controller 132, as illustrated in FIG. 2.

The camera module 136 obtains an image around the vehicle during the vehicle driving, and transfers the obtained image to the controller 132. The radar module 138 senses the presence or absence of front and rear vehicles, a distance to the vehicle, the presence or absence of pedestrians, and the like, according to the movement of the vehicle, and transfers the sensed information to the controller 132. The communication module 134 transfers the ADAS information to the GNSS terminal 150 through, for example, a wired interface such as a USB port or a serial port. In addition, the controller 132 controls the camera module 136, the radar module 138, and the communication module 134 so as to process functions of the ADAS device 130. The controller 132 processes and analyzes the image transmitted from the camera module 136 or determines an object sensed by the radar module 138 to generate the ADAS information according to the lane recognition, the front vehicle recognition, the pedestrian recognition, the front object detection, the distance measurement, and the like. The controller 132 performs control to transmit the generated ADAS information to the GNSS terminal 150 through the communication module 134. In addition, when an event occurs in ADAS information, the controller 132 transmits a notification command according to the occurrence of the event to the OBD2 device 142 of the vehicle 100 through a universal asynchronous receiver-transmitter (UART).

Such an ADAS device 130 is a device assisting the driver in safe driving, and performs functions such as forward collision avoidance, lane departure warning, blind spot monitoring, driver drowsiness sensing, and rear monitoring using a radar and a camera. When an event occurrence status needs to be transferred to the driver, the ADAS device 130 may, for example, warn the driver of the event occurrence status by a sound, visually display the event occurrence status on a rearview mirror or the like, or apply vibrations to a seat or a steering wheel to allow the driver tactilely recognize the event occurrence status.

The advanced emergency braking system (AEBS) device 140 includes the OBD2 device 142 and a brake actuator (B/A) 144, and when an event, for example, forward collision, lane departure, pedestrian recognition, or the like, is sensed from the ADAS device 130 and a notification command is transmitted to the OBD2 device 142, the OBD2 device 142 controls the brake actuator (B/A) 144 to automatically operate. Accordingly, the OBD2 device 142 transmits emergency braking information related to the AEBS device 140 to the ADAS device 130.

The global navigation satellite system (GNSS) terminal 150 is installed in the vehicle, is connected to a plurality of base stations in order to collect information with higher precision than general GPS, and obtains position information according to vehicle driving in real time (e.g., in units of 1 second, etc.). The GNSS terminal 150 automatically switches channel connections to adjacent base stations so as to correct position information between the adjacent base stations during the vehicle driving. For example, the GNSS terminal 150 covers a plurality of base stations in a radius of about 10 km of a corresponding area during the vehicle driving, and accordingly, obtains and corrects position information in both directions in real time. In addition, the GNSS terminal 150 is connected to the smart band 110 and the accident response service server 200 through a wireless communication network, a mobile communication network, or the like, and is connected to the DSM device 120 and the ADAS device 130 through a wired interface or the like, in order to collect data based on an ultra-precise position during the vehicle driving. To this end, the GNSS terminal 150 includes a GNSS antenna 154, a GNSS module 156, a communication module 158, a memory 159, and a controller 152, as illustrated in FIG. 2.

The GNSS antenna 154 is connected to a plurality of base stations through artificial satellites. The GNSS module 156 obtains high-precision position information from the GNSS antenna 154 in real time during the vehicle driving, and transfers the obtained position information to the controller 152 in real time or periodically (e.g., in units of seconds, etc.). Here, the position information transmitted to the controller 152 is transmitted as, for example, national marine electronics association (NMEA) data including information such as a time, a position, and an orientation. The communication module 158 is connected to the smart band 110, the DSM device 120, and the ADAS device 130 through a wireless communication network, a mobile communication network, a wired interface, or the like, and is connected to the accident response service server 200 through the communication network 4 such as a wireless communication network, a mobile communication network, or a dedicated communication network. The memory 159 receives the position information, for example, the NMEA data from the controller 152, temporarily stores the position information, and updates the position information in real time. In addition, the controller 152 controls the GNSS module 156, the communication module 158, and the memory 159 so as to process functions of the GNSS terminal 150. The controller 152 performs control to transmit the position information obtained through the GNSS module 156 and the driver status information and the vehicle driving information collected through the communication module 158 to the accident response service server 200 through the communication network 4.

Such a GNSS terminal 150 obtains and corrects position information according to the movement of the vehicle 100 in real time, senses driver status information and vehicle driving information in real time from various sensors installed in the vehicle 100 and worn by the driver, and transmits the sensed information to the accident response service server 200 that provides a traffic accident prevention service.

Referring to FIG. 1 again, the accident response service server 200 collects various information according to the vehicle driving to produce mobile IoT-based driving data according to the vehicle driving in real time, thereby implementing a standardized system related to safe driving of the vehicle, such as drowsy driving prevention, traffic accident prevention, and generation of a notification and a warning according to the occurrence of the event. That is, the accident response service server 200 provides an accident response service for preventing a traffic accident by collecting position information and various information such as a driver's status and a vehicle driving status according to vehicle driving transmitted from each of a plurality of GNSS terminals 150 and analyzing and learning such information to detect driver's drowsy driving or notify or warn the driver of the occurrence of an event in advance when any one of various events occurs during the vehicle driving.

Such an accident response service server 200 may provide various data related to the accident response service to the accident support system 300 of related organizations such as the National Police Agency, the Road Traffic Authority, and a local government, or the application system 400 of a private company such as an insurance company or a navigation company to allow the various data to be utilized for various purposes.

Specifically, the accident response service server 200 includes a server 210 and a database 250, as illustrated in FIG. 3. The server 210 corrects position information based on the Internet using, for example, an IoT platform and transmits a standard radio technical committee for maritime service (RTCM) signal, and includes a network transport of RTCM via Internet protocol (NTRIP) server for authenticating a user, an interface server for time synchronization and data processing, an access server for managing an IoT device, and the like, and the database 250 includes, for example, a vehicle information DB, a sensor collection DB, an accident response DB, and the like.

The server 210 according to the present embodiment includes a control unit 212, a communication unit 214, a position determination unit 216, an information collection unit 218, an analysis unit 220, a big data learning unit 222, a risk calculation unit 224, a drowsiness detection unit 226, a monitoring unit 228, and a notification unit 230.

The control unit 212 controls each of the communication unit 214, the position determination unit 216, and the information collection unit 218, the analysis unit 220, the big data learning unit 222, the risk calculation unit 224, the drowsiness detection unit 226, the monitoring unit 228, the notification unit 230, and the database 250 so as to process various functions of the accident response service server 200 in conjunction with the GNSS terminal 150 of each of a plurality of vehicles 100.

The communication unit 214 is connected to the communication network 4, and receives position information, driver status information, vehicle driving information, and an image from the GNSS terminal 150 of the vehicle in real time. The communication unit 214 transmits notification information to the driver terminal 500 through the communication network 4 at the time of the occurrence of an event. In addition, the communication unit 214 may provide various information related to the accident response service to the accident support system 300 and the application system 400 through the communication network 4.

The position determination unit 216 determines the position information transmitted from the GNSS terminal 150 in real time during the vehicle driving to monitor a position of the vehicle 100 in real time. The position determination unit 216 corrects the position information of the vehicle so as to correspond to adjacent base stations during the vehicle driving.

The information collection unit 218 collects position information, driver status information, and vehicle driving information transmitted from the GNSS terminal 150 of each of the plurality of vehicles 100, and stores such information in the database 250 to construct big data. The information collection unit 218 collects, for example, GNSS information, OBD2 information, smart band information, DSM information, ADAS information, emergency braking information, driver information, vehicle position information, vehicle driving information, and the like, in real time or periodically repeatedly. The information collection unit 218 stores the collected information in the database 250. In the present embodiment, the information collection unit 218 collects various information according to the vehicle driving through the GNSS terminal 150 in real time or periodically (e.g., once per second, etc.).

The analysis unit 220 statistically analyzes the information collected by the information collection unit 218 to determine whether or not an event has occurred according to a driver's status and a vehicle driving status. The analysis unit 220 analyzes the images obtained from the camera module 126 of the DSM device 120 to determine the drowsy driving status. The analysis unit 220 analyzes a pattern according to the driver's status and the vehicle driving status to predict whether or not an accident will occur.

The big data learning unit 222 repeatedly learns the collected information and an analysis result so as to determine the driver's status, the vehicle driving status, an accident type prediction, road risk index calculation, and the like, through artificial intelligence (AI), deep learning, or the like, thereby constructing big data for providing the accident response service.

The risk calculation unit 224 calculates a risk index of a road on which the vehicle is being driven through the position information, the vehicle driving information, and the like. The risk calculation unit 224 provides the calculated road risk index to the driver of the vehicle that is being driven in real time.

The drowsiness detection unit 226 determines whether or not the driver is in a drowsy driving status through a status of a driver's heart rate, acceleration, iris, face, and the like, sensed through pattern learning of the driver status information. When the driver is in the drowsy driving status, the drowsiness detection unit 226 transmits the corresponding information to the notification unit 230.

The monitoring unit 228 displays the driver status information and the vehicle driving information to perform monitoring in real time. The monitoring unit 228 may display a position of the vehicle 100 on an electronic map, and apply a road situation according to the driving of the vehicle 100 or a road risk index according to the position of the vehicle 100 to guide a road situation in real time.

The notification unit 230 generates notification information on an event and transmits the notification information to the driver terminal 500, in order to notify or warn the driver of the occurrence of the event when the event according to the drowsy driving status, the vehicle driving status, the road risk, and the like, occurs during the driving of the vehicle from the analysis unit 220, the big data learning unit 222, the risk calculation unit 224, and the drowsiness detection unit 226.

In addition, the database 250 stores and manages various information collected and generated according to a process of processing various functions of the accident response service server 200 under the control of the control unit 212. The database 250 according to the present embodiment stores at least driver information 252, vehicle information 254, driver status information 256, vehicle position information 258, vehicle driving information 260, ADAS information 262, emergency braking information 264, analysis information 266, response information 268, and notification information 270. Such a database 250 is included in the accident response service server 200, but may also be provided independently.

The accident response service server 200 described above may provide the accident response service for preventing a traffic accident in advance by obtaining GNSS-based position information of each of the vehicles, collecting various information on the driver's status and the vehicle driving status of the vehicle that is being driven in real time to construct big data, and analyzing and repeatedly learning the collected information.

Accordingly, the safe driving support system 2 based on a mobile IoT agent according to the present disclosure may open data as public data so as to be applied to various applications to secure a quality and a standard of the data, support various data amounts and formats, provide the data in various forms and for various purposes, continuously manage the data.

Figure 4:
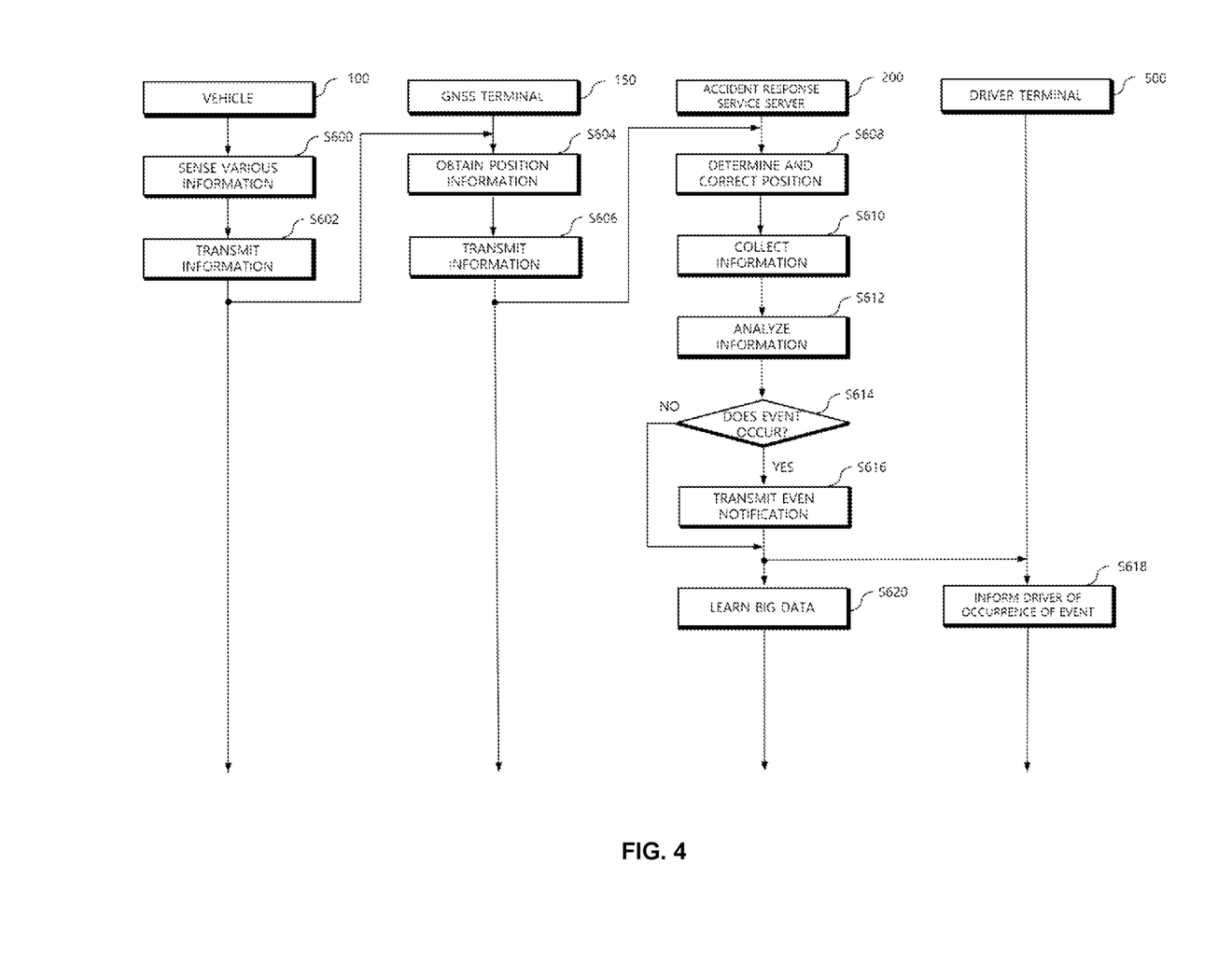
FIG. 4 is a flowchart illustrating a processing procedure of a safe driving support system based on a mobile IoT agent according to the present disclosure.

In addition, FIG. 4 is a flowchart illustrating a processing procedure of a safe driving support system based on a mobile IoT agent according to the present disclosure.

Referring to FIG. 4, the safe driving support system 2 based on a mobile IoT agent according to the present disclosure senses various information including driver status information such as a driver's heart rate and acceleration, vehicle position information, and vehicle driving information such as ADAS information and emergency braking information according to vehicle driving from various sensors installed in the vehicle 100 or mounted on the driver, for example, the heart rate sensor 116 and the acceleration sensor 118 of the smart band 110, the camera module 126 of the DSM device 120, the camera module 136 and the radar module 138 of the ADAS device 130, and the like, in real time in S600, and transmits the sensed various information to the GNSS terminal 150 through a wireless communication network, a mobile communication network, a wired interface, or the like, in S602.

The GNSS terminal 150 obtains position information in real time during vehicle driving in S604, and transmits the various information transmitted from the vehicle to the accident response service server 200 through the communication network 4 in S606.

The accident response service server 200 determines the position information transmitted from the GNSS terminal 150 and corrects the position information of the vehicle that is being driven in real time by switching an automatic channel between base stations in S608.

The accident response service server 200 collects the various information transmitted from the GNSS terminal 150 in S610, and analyzes the collected information in S612 to determine whether or not an event has occurred.

When the event has occurred in S614 as an analysis result, the accident response service server 200 generates notification information according to the occurrence of the event and transmits the notification information to the driver terminal 500 in S616. However, when the event has not occurred as an analysis result, the processing procedure proceeds to S620. The driver terminal 500 receives the notification information from the accident response service server 200 and informs or warns the driver of the occurrence of the event in S618. Next, the accident response service server 200 learns the collected information based on the analysis result to construct big data for the accident response service in S620.

Although the configuration and the operation of the safe driving support system based on a mobile IoT agent according to the present disclosure have been described and illustrated in the detailed description and the drawings hereinabove, this is merely described by way of example, and various modifications and alterations may be made without departing from the technical spirit of the present disclosure.

What is claimed is:

1. A safe driving support system based on a mobile Internet of Things (IoT) agent, comprising:
    a smart band worn by a driver of a vehicle that is being driven and sensing heart rate information of the driver and acceleration information according to driver's movement;
    a driver status monitoring (DSM) device installed inside the vehicle, including a first camera module, and obtaining an image including a driver's iris and face to sense driver status information;
    an advanced driver assistance system (ADAS) device installed in the vehicle, including a second camera module to obtain an image around the vehicle during vehicle driving, including a radar module to sense the presence or absence of an object and a distance to the object in a surrounding situation of the vehicle, receiving vehicle driving information according to the vehicle driving from an on-board diagnostics-II (OBD2) device of the vehicle in real time to generate driver assistance information, and transmitting a notification command to the OBD2 device when an event occurs in the driver assistance information;
    an advanced emergency braking system (AEBS) device generating emergency braking information and transmitting the emergency braking information to the ADAS device when the OBD2 device receives the notification command from the ADAS device and operates a brake actuator;

a global navigation satellite system (GNSS) terminal installed in the vehicle, connected to a plurality of base stations through an artificial satellite to obtain position information of the vehicle in real time, receiving the heart rate information, the acceleration information, and the driver status information from the smart band and the DSM device, receiving the driver assistance information and the emergency braking information from the ADAS device, and transmitting the position information of the vehicle, the driver status information, the vehicle driving information, and the emergency braking information; and an accident response service server providing an accident response service so as to prevent a traffic accident by collecting the position information of the vehicle, the driver status information, and the vehicle driving information transmitted from the GNSS terminal included in each of a plurality of vehicles and analyzing and learning the collected information to detect driver's drowsy driving or notify or warn the driver of an event occurrence situation by transmitting notification information to a driver terminal when the event occurs during the vehicle driving.

2. The safe driving support system based on a mobile IoT agent of claim 1, wherein the GNSS terminal automatically switches channel connections with adjacent base stations during the vehicle driving to correct the obtained position information in real time.

3. The safe driving support system based on a mobile IoT agent of claim 1, wherein the accident response service server statistically analyzes the collected information to determine whether or not the event has occurred according to a driver's status and a vehicle driving status, analyzes images obtained from the first camera module to determine a driver's drowsy driving status, or analyzes a pattern of the driver status information and the vehicle driving information to predict whether or not an accident is to occur.

4. The safe driving support system based on a mobile IoT agent of claim 3, wherein the accident response service server repeatedly learns the collected information and an analysis result so as to determine at least a driver's status, a vehicle driving status, an accident type prediction, and a road risk to construct big data for providing the accident response service.

5. The safe driving support system based on a mobile IoT agent of claim 4, wherein the accident response service server calculates a risk index of a road on which the vehicle is being driven through the position information of the vehicle and the vehicle driving information, and provides the calculated road risk index to the driver of the vehicle that is being driven in real time.

6. The safe driving support system based on a mobile IoT agent of claim 4, wherein the accident response service server determines whether or not the driver is in a drowsy driving status through pattern learning of the driver status information, and provides information indicating that the driver is in the drowsy driving status to the driver of the vehicle that is being driven in real time when the driver is in the drowsy driving status.

* * * * *